UNITED STATES PATENT OFFICE.

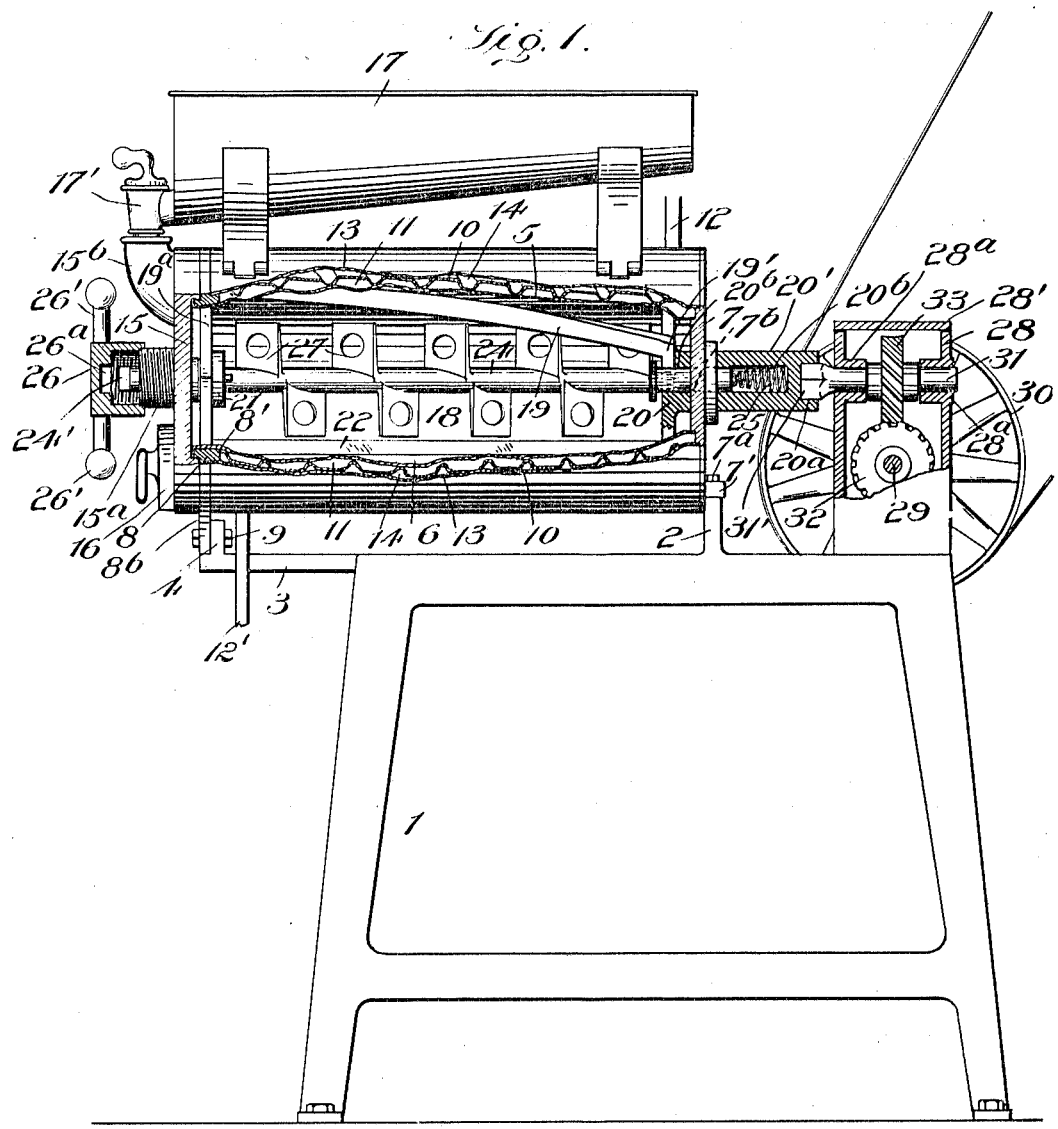

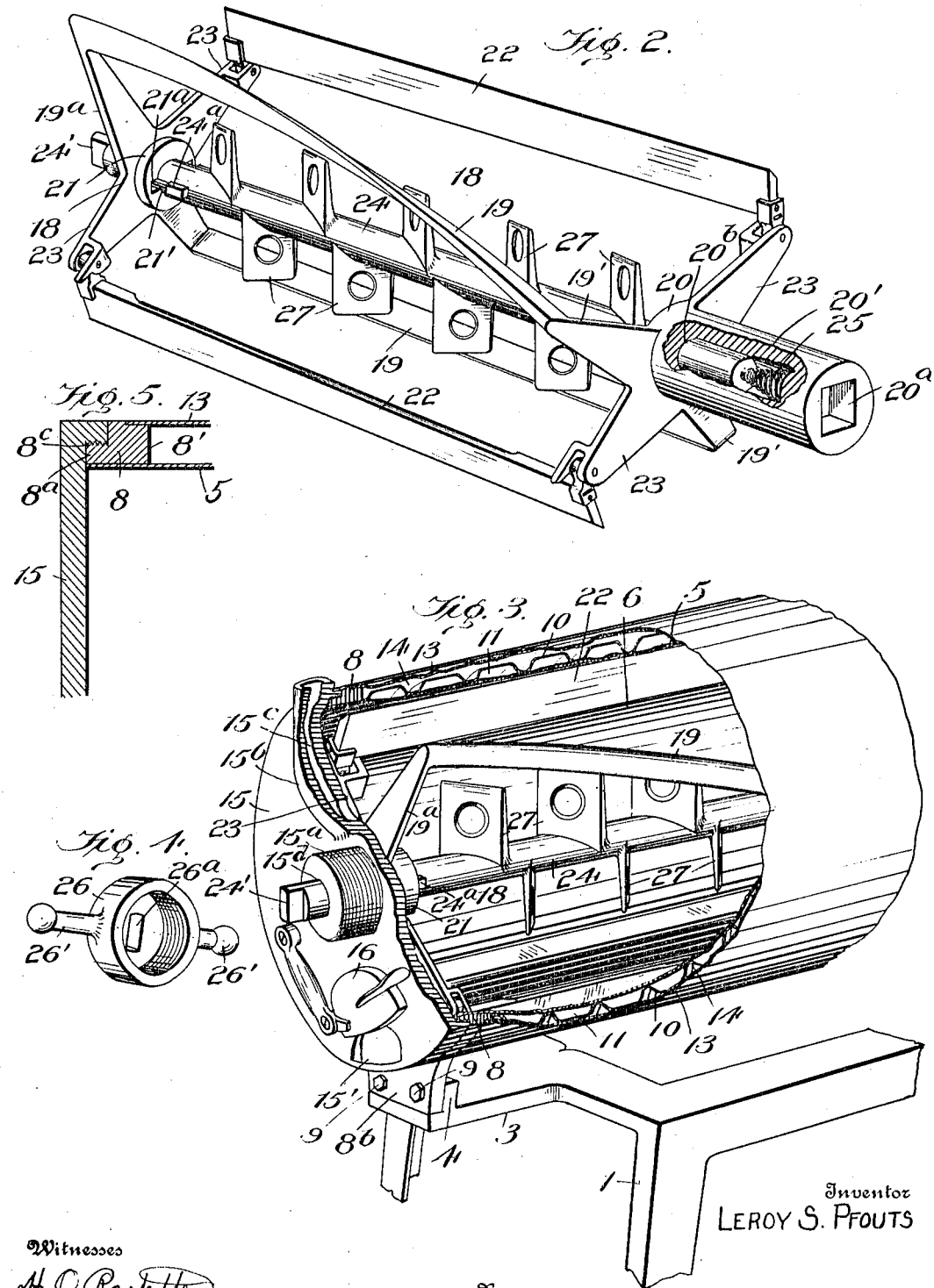

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

ICE-CREAM FREEZER.

1,116,110.     Specification of Letters Patent.     Patented Nov. 3, 1914.

Application filed November 8, 1906. Serial No. 342,500.

*To all whom it may concern:*

Be it known that I, LEROY S. PFOUTS, a citizen of the United States, residing at Canton, in the county of Stark and State of Ohio, have invented new and useful Improvements in Ice-Cream Freezers, of which the following is a specification.

This invention relates to an improvement in ice cream freezers.

It pertains particularly to mechanism for agitating, whipping, and automatically discharging from the freezing cylinder of the machine, the material which is being treated therein.

Figure 1 is a view partly in side elevation and partly in section of an ice cream freezer embodying my improvements. Fig. 2 is a perspective view of the agitating, whipping and propelling mechanism removed from the freezing cylinder. Fig. 3 is a perspective view partly in section of a portion of the freezer. Fig. 4 is a perspective view of the clutch controlling cap or device for the agitating, whipping and propelling mechanism detached. Fig. 5 is a sectional detail view showing the front end construction of the freezer.

In the drawing, 1 indicates a suitable frame. From the top of this frame there rises a transversely arranged cylinder support 2. 3 is a forwardly projecting ledge carried by said frame and having near its front end an upwardly extending transversely arranged flange 4.

5 indicates as an entirety a cylinder preferably of sheet metal, and surrounding a material freezing chamber 6. I prefer that this cylinder should be horizontally disposed, though it is not essential to my invention that it should be. 7 is a head or end for the rear end of said freezing cylinder and secured thereto in any suitable manner. Near its bottom this head carries a rearwardly extending transversely arranged lug or flange 7' which is adapted to rest upon the top of the upright or support 2, and to be secured thereto by a bolt 7ᵃ. The head 7 has an axially disposed hole 7ᵇ extending through it for a purpose to be hereinafter described. Near its front end the freezing cylinder has fitted over and secured to it a ring or annular plate 8 having a rearwardly extending annular flange 8', forwardly extending annular flange 8ᵃ, and a downwardly extending projection 8ᵇ adapted to be clamped to the flange 4 at the front end of the frame by means of bolts 9 or in any other suitable manner.

I prefer to surround the freezing cylinder 5 with a brine circulating conduit. This conduit may be formed in any suitable manner. In the drawings I show a spirally corrugated cylinder 10 snugly fitted over the cylinder 5 in such manner that the outer wall of the cylinder 5 forms one wall of a spiral brine passage 11, the other walls of which are formed by the corrugated cylinder 10. 12 is an inlet for brine to said brine coil and 12' is a suitable outlet for the brine from the coil. It will be noted that during its course of travel through the machine the brine flows in immediate engagement with the outer surface of the thin wall of the freezing cylinder 5 so as to cause a most efficient transfer of heat.

A suitable casing 13 is formed around the corrugated cylinder 10 and there may be an air space 14, as shown, to form an insulating jacket around the latter, or some suitable insulating material may be interposed between the outer wall of the said corrugated cylinder and the inner wall of the casing 13.

The forwardly extending collar 8ᵃ at the front end of the machine is preferably externally screw-threaded as indicated at 8ᶜ to receive a readily detachable internally threaded head 15 for the front end of the cylinder.

15' is a passageway or material discharge opening through the head 15 at a point which is at the bottom of the freezing cylinder and in line with the bottom wall thereof when the head is in working position.

15ᵃ is an axially bored, externally screw threaded boss extending forward from the center of said head for a purpose to be hereinafter described. Diagonally opposite from the said opening 15' is a material inlet hopper or funnel 15ᵇ, preferably formed integral with the head end and having a material inlet passageway 15ᶜ leading through it from a point adjacent to the periphery of the head and opening on the inner face thereof at a point near its center.

16 is a pivotally mounted cut-off valve or plate for controlling the discharge of material from the freezing cylinder.

17 is a tank of any suitable form of construction supported above the freezing cylinder and adapted to carry in fluid form a mixture to be introduced into the freezing cylinder to be treated. At the bottom of its front end this tank has extending from it a spigot or valve 17' arranged to direct the said material into the mouth of the funnel 15ᵇ.

18 indicates as an entirety, the mechanism placed within the freezing cylinder for agitating, whipping, and propelling the material to discharge it from the cylinder and scraping blades for scraping the walls of the freezing chamber and preventing the solidifying or congealing of material thereon. Preferably this mechanism comprises a pair of spiral twisted whipping, agitating, and material-propelling blades 19, each at its rear end secured to or formed integral with a radially projecting arm 19' carried by an end-piece or head 20; and each at its front end secured to or formed integral with a radial arm 19ᵃ extending radially from an end-piece or head 21. 22 are longitudinally disposed scraper blades, each pivotally mounted at either end to the outer end of a radially extending arm 23 carried by both the end-pieces 20 and 21 of this whipping, agitating and material-propelling mechanism.

20' is a journal secured to or formed integral with the end-piece 20 and extending rearwardly therefrom. At its rear end it has a square socket 20ᵃ for a purpose to be later described, and in front of this socket it is axially recessed or bored out as indicated at 20ᵇ to form a bearing for the rear end of an axially disposed longitudinally arranged beater shaft 24, the front end of which extends through an axial opening 21' in the front dasher end 21 and thence through the alined opening 15ᵈ extending through the front detachable head 15 of the cylinder and the forwardly extending screw threaded boss 15ᵃ thereon. At its extreme front end this shaft 24 is substantially rectangularly shaped as indicated at 24'.

24ᵃ are splines or keys projecting laterally from the shaft 24 near its front end and each adapted to enter a corresponding groove or key-way 21ᵃ in the front end 21 of the whipping, beating and material-propelling frame 18.

25 is a coiled spring interposed between the rear end of the shaft 24 and the end wall of the recess 20ᵇ in the journal 20', this spring serving to normally force the said shaft forward so as to cause the splines or keys 24' thereon to enter the key-ways or grooves 21ᵃ in the head 21.

26 is a cap having laterally extending hand grips 26'. This cap is interiorly screw threaded to fit upon the screw threaded boss 15ᵃ on the front detachable end of the freezer and has a substantially rectangularly shaped recess or socket 26ᵃ in the inner face of its end wall adapted to receive the substantially rectangularly shaped front end 24' of the shaft 24.

27 are radially disposed beater blades arranged in longitudinal series along the shaft 24 with which they may be integrally formed, these radially arranged beating and agitating blades preferably being spirally disposed along said shaft in such manner as to tend, when rotating, to force the material with which they engage toward the discharge end of the freezing cylinder.

28 represents a gear box suitably secured upon the rear end of the frame 1 and having a detachable cover 28'. 29 is a transversely arranged power driven shaft suitably mounted in bearings in the said box 28 and receiving its power from a belt pulley 30 which may be belted to any suitable source of power.

31 is a longitudinally disposed shaft having its axis in alinement with the axis of the freezing cylinder 5 and suitably mounted near either end in bearings 28ᵃ in the said bearing box.

32 is a spiral gear rigidly secured to the shaft 29 and in mesh with the spiral gear 33 rigidly secured to the shaft 31. The front end of the shaft 31 is squared as indicated at 31' to fit into the socket 20ᵃ in the journal 20' of the agitating, whipping, material-propelling frame 18.

In operation a charge of material to be frozen is introduced into the freezing chamber 6 through the material inlet 15ᶜ at the front end of the cylinder. The cap 26 is screwed upon the boss 15ᵃ until it has engaged the front end 24' of the shaft 24 carrying the inner set of beaters, agitators and material propellers and has forced the said shaft rearwardly against the pressure of the spring 25 until the keys or splines 24ᵃ are entirely out of engagement with the walls of their corresponding grooves or recesses 21ᵃ in the end 21 of the outer material-agitating, whipping and propelling devices. The brine or other cooling medium is then caused to flow through the spiral passageway about the freezing cylinder and power is applied through the belt pulley 30 to rotate the shaft 29 and the journal 20'. The radially disposed blades 27 on the shaft 24 are held stationary when the cap 26 is in its rearmost position on the boss 15ᵃ, since the shaft 24 is then unclutched from the end-piece 21 and is held from rotating by the engagement of its rectangularly shaped front end with the walls of the recess 26ᵃ in said cap. The outer part of the agitating, whipping and material-propelling mechanism alone will rotate with the shaft 31 under these conditions. This being the case the outer rotating blades will throw the material against the inner now stationary ones and it will be constantly broken up, whipped up, and beaten up, the inner radially disposed blades really tending to check the travel of the material in the direction in which it is impelled by the outer longitudinally disposed ones. As soon as the material within the freezing cylinder has reached the point at which it is desirable to have it discharged from the cylinder, the operator unscrews the cap 26, and the spring 25 forces forward the shaft 24 until the elements of the clutch between it and the end 21 of the whipping, beating and material-propelling mechanism are in engagement with each other. When the parts are in this relation to each other the inner radially disposed beating, whipping and material-propelling blades 27 and the outer longitudinally disposed ones 19 will rotate together in the same direction and both will tend to advance the material within the cylinder toward the discharge end thereof. The gate or valve 16 is then thrown open and the material is forced out through the discharge opening 15′. Practically the entire charge of material will be automatically discharged from the cylinder by the mechanism herein shown.

I am aware of the fact that it has heretofore been proposed to provide in a freezing cylinder of an ice cream freezer mechanism for agitating, whipping and propelling material within the cylinder, comprising inner radially arranged spirally disposed blades and outer longitudinally disposed spirally twisted blades, both of which were arranged to rotate in the same direction and that it has also been proposed to provide agitating, whipping and material-propelling mechanism for ice cream freezer cylinders, comprising inner radially arranged spirally disposed blades and an outer longitudinally arranged spirally twisted blade arranged to rotate in opposite directions.

In attempting to avoid the necessity of double drive gearing for rotating the inner and outer parts of such a mechanism in opposite directions I have found that where both the inner and outer parts are all caused to rotate in one direction, a sort of churning motion is set up within the freezing chamber and the material therein is not whipped up or aerated, or as thoroughly beaten as is essential for producing a smooth product and a relatively large yield for a given quantity of material introduced into the cylinder. And by holding the inner part of my whipping, beating and material-propelling mechanism stationary while rotating the outer part during the freezing operation, I find that the material to be frozen is much more thoroughly whipped, beaten, mixed and aerated than where the inner and outer parts are allowed to rotate together in one direction. However, I have found it essential to the complete and thoroughly satisfactory automatic discharge of such a machine as the one herein shown, that both the inner and outer parts of the mechanism should rotate together during the time when the material is being automatically discharged from the cylinder and for this purpose I interpose a suitable clutch mechanism between the power driven parts of the freezer and the inner agitating and propelling blades whereby the latter may at will be connected with or disconnected from the power driven parts and besides this have devised means for holding the said inner parts stationary when they are disconnected from the power driven parts.

It is not essential to the spirit of my invention that the freezing cylinder should be horizontally disposed, as the material-agitating, whipping and propelling parts will operate precisely the same when the freezer is on end as when it is disposed horizontally. Nor need the blades necessarily be spirally twisted so long as they are mounted in such manner as to tend to cause the material engaged by them to move toward the discharge end of the cylinder.

It will be noted that the inner and outer parts of the material agitating device and the power transmitting mechanism for rotating said parts are so correlated that, at the will of the operator, the material to be treated within the cylinder may be subjected to greater or less agitation. If the utmost agitation of which the device is capable is desired, the operator unscrews the clutch operating cap 26 until the inner part of the material agitating device is clutched, or connected with the power transmitting mechanism through the instrumentality of the keys 24$^a$ and key ways 21$^a$. Should it be desirable for any reason to have the material less severely agitated, the operator screws up on the cap 26, so as to cause it to engage with the end 24′ of the inner part of the material agitating device and to force this part of the device rearwardly until it is unclutched from its rotating means.

I disclaim: the combination for an ice cream freezer of an inner cylinder having a head closing one end thereof, an outer cylinder surrounding said inner cylinder, means forming a tortuous passageway between the cylinders, one wall of said passageway being constituted by the outer wall of said inner cylinder, a ring closing the annular space between the cylinders at their opposite ends from said head, and a cylinder head carried by said ring and removable therefrom at will; believing the same to be the invention of John C. Miller, formerly of Canton, Ohio. I also believe the said John C. Miller to be the first inventor of the foregoing subject matter which is disclaimed by me, when embodied in an apparatus in which a helically grooved metal cylinder surrounds the inner cylinder and forms with it a tortuous passageway for the cooling medium.

I claim—

1. In an ice cream freezer, the combination with a freezing chamber, having a valved discharge opening at one end thereof, of a rotatable material-agitating and ejecting device arranged within said cylinder and comprising inner and outer parts, means for rotating said parts, and means for holding one of said parts stationary within the said freezing chamber at will.

2. In an ice cream freezer, the combination with a stationary freezing cylinder having a material-discharge opening at one end thereof, of a rotatable material-agitating device arranged within said cylinder and comprising inner and outer parts, the outer part being arranged to move material toward and eject it through said discharge opening, means for rotating the parts of said material-agitating device, and means for holding one of said parts stationary within said freezing cylinder at will.

3. In an ice cream freezer, the combination with a stationary freezing cylinder having a material discharge opening at one end thereof, of a rotatable material-agitating and propelling device arranged within said cylinder and comprising inner and outer rotatable parts, each one of which is adapted to move material toward said discharge opening, means for rotating said parts, and means for holding one of said parts stationary within the said freezing cylinder at will.

4. In an ice cream freezer, the combination with a suitable freezing chamber, of a material-agitating and ejecting device arranged therein and comprising inner and outer rotatable parts, means for rotating said parts together in the same direction, and means for holding the inner one of said parts stationary within said chamber at will.

5. In an ice cream freezer, the combination with a suitable freezing chamber, of a material-agitating and propelling device arranged therein and comprising inner and outer spirally disposed rotatable parts, means for rotating said parts together in the same direction, and means for holding the inner one of said parts stationary within said chamber at will.

6. In an ice cream freezer, the combination with a suitable freezing chamber, of a material-agitating and propelling device comprising inner and outer rotatable parts, means for rotating said parts together in the same direction, and means for disconnecting said inner part from said rotating means at will and allowing the said outer part to rotate within said chamber and around the inner one.

7. In an ice cream freezer, the combination with a suitable freezing chamber having a material discharge opening at one end thereof, of a material-agitating and propelling device comprising inner and outer rotatable parts, the said outer part being arranged to move material toward and eject it through said discharge opening, means for rotating said parts together in the same direction, means for disconnecting said inner part from said rotating means at will and allowing the said outer part to rotate within said chamber and around the inner one, and means for holding the inner part stationary within the said chamber while it is disconnected from said rotating means.

8. In an ice cream freezer, the combination with a freezing cylinder of a material-agitating and propelling device arranged therein and comprising inner and outer rotatable parts, and means for rotating said parts including a clutch for connecting the inner one of said parts to or disconnecting it from its driving means while permitting the outer one of said parts to rotate about the said inner one.

9. In an ice cream freezer, the combination with a freezing cylinder of a material-agitating and propelling device arranged therein and comprising inner and outer rotatable parts, means for rotating said parts including a clutch for connecting the inner one of said parts to or disconnecting it from its driving means while permitting the outer one of said parts to rotate about the said inner one, and means for holding the inner one of said parts stationary when it is unclutched from its driving means.

10. In an ice cream freezer, the combination with a freezing cylinder, having a material discharge opening at one end thereof, of a material-agitating and propelling device arranged therein and comprising an inner part having material engaging blades, and an outer part having material engaging blades adapted to beat the material, propel it toward and eject it through said discharge opening, and means for rotating said parts including a clutch for connecting the inner one of said parts to and disconnecting it from its driving means while the outer one of said parts rotates about the said inner one.

11. In an ice cream freezer, the combination with a freezing cylinder having a suitable material inlet and a discharge opening at one end thereof, of a material-agitating and propelling device arranged within said cylinder and comprising inner and outer rotatable parts, each one of which is adapted to move the material with which it engages toward said discharge opening, means for rotating said parts including a clutch for connecting the inner one of said parts to or disconnecting it from its driving means while permitting the outer one to rotate around the inner one within the cylinder, and means for holding the said inner part stationary when it is unclutched from its driving means.

12. In an ice cream freezer, the combination with a freezing cylinder having a valved material discharge opening at one end thereof, of a rotatable material agitating device arranged within said cylinder and comprising inner and outer parts, the outer part being arranged to move material toward and eject it through said material discharge opening, means for rotating the parts of said material agitating device, and means for holding at will one of said parts stationary within said freezing cylinder while the other one rotates.

13. In an ice cream freezer, the combination with a stationary freezing cylinder, horizontally disposed and having heads at opposite ends thereof, one of which is provided with a material discharge opening and a discharge valve therefor, of material agitating and ejecting mechanism arranged within said cylinder, supported by the end walls thereof, and comprising an inner part having a series of radially disposed material engaging blades, and an outer part having longitudinally disposed material engaging means adapted when in operation to beat the material, propel it toward and eject it through said discharge opening, and means for operating the parts of said material agitating and ejecting mechanism, including a clutch for connecting said inner part to and disconnecting it from said rotating means.

14. In an ice cream freezer, the combination with a stationary, horizontally disposed freezing cylinder, having heads at either end thereof, one of which is provided with a discharge opening and a discharge valve therefor, of material agitating and ejecting mechanism arranged within said cylinder and comprising inner and outer parts rotatably supported in said cylinder heads, and power transmitting mechanism for rotating said parts, including a clutch for connecting said inner part to and disconnecting it from said power transmitting mechanism at will during the operation of the freezer while permitting the outer one of said parts to rotate about the said inner one.

In testimony whereof I affix my signature, in presence of two subscribing witnesses.

LEROY S. PFOUTS.

Witnesses:
J. A. JEFFERS,
SYLVIA BORON.